(12) United States Patent
Sarenac et al.

(10) Patent No.: US 11,199,512 B2
(45) Date of Patent: Dec. 14, 2021

(54) COLLIMATOR SYSTEM

(71) Applicant: Quantum Valley Investment Fund LP, Waterloo (CA)

(72) Inventors: Dusan Sarenac, Waterloo (CA); Connor Kapahi, Waterloo (CA); Dmitry A. Pushin, Toronto (CA); David G. Cory, Branchton (CA)

(73) Assignee: Quantum Valley Investment Fund LP, Waterloo (CA)

( * ) Notice: Subject to any disclaimer, the term of this patent is extended or adjusted under 35 U.S.C. 154(b) by 181 days.

(21) Appl. No.: 16/751,740

(22) Filed: Jan. 24, 2020

(65) Prior Publication Data

US 2020/0240931 A1 Jul. 30, 2020

Related U.S. Application Data

(60) Provisional application No. 62/796,377, filed on Jan. 24, 2019.

(51) Int. Cl.
*G01N 23/02* (2006.01)
*G21G 4/02* (2006.01)
(Continued)

(52) U.S. Cl.
CPC ............ *G01N 23/025* (2013.01); *G21G 4/02* (2013.01); *G21K 1/02* (2013.01); *G21K 1/16* (2013.01)

(58) Field of Classification Search
CPC ....................................................... G02K 1/16
See application file for complete search history.

(56) References Cited

U.S. PATENT DOCUMENTS 6,054,708 A 4/2000 Shimizu
8,101,920 B2 1/2012 Suzuki
(Continued)

FOREIGN PATENT DOCUMENTS

WO    WO 2016037598    *  3/2016

OTHER PUBLICATIONS

Carlile , et al., "High-efficiency Soller slit collimators for thermal neutrons", Journal of Physics E: Scientific Instruments, p. 543, 1977, 5 pgs.

(Continued)

*Primary Examiner* — Yara B Green
(74) *Attorney, Agent, or Firm* — Henry Patent Law Firm PLLC

(57) ABSTRACT

In a general aspect, a collimator system is described. In some aspects, a neutron beam collimation method includes receiving a neutron beam from a neutron source; polarizing the neutron beam using a polarizer, and obtaining a collimated neutron beam from the polarized neutron beam. The neutron beam generated by the neutron source has a first beam divergence and includes a plurality of neutrons. The collimated neutron beam has a second beam divergence that is less than the first beam divergence. Obtaining the collimated neutron beam includes mapping transverse momentum of each respective neutron, of the plurality of neutrons, onto a polarization degree of freedom of the respective neutron by applying a sequence of phase shift gradients to the polarized neutron beam, and after applying the sequence of phase shift gradients, passing the polarized neutron beam through an analyzer.

27 Claims, 7 Drawing Sheets

(51) Int. Cl.
　　　*G21K 1/16*　　　(2006.01)
　　　*G21K 1/02*　　　(2006.01)

(56) References Cited

U.S. PATENT DOCUMENTS 10,215,715 B1　　2/2019　Cory et al.
2010/0032554 A1*　2/2010　Shimizu ................... G21K 1/16
　　　　　　　　　　　　　　　　　　　　　　　250/251

OTHER PUBLICATIONS

Cussen, et al., "Tests of a silicon wafer based neutron collimator", Nuclear Instruments and Methods in Physics Research Section A: Accelerators, Spectrometers, Detectors and Associated Equipment, pp. 392-397, 2001, 6 pgs.

Petrillo, et al., "A honeycomb collimator for the neutron Brillouin scattering spectrometer BRISP", Nuclear Instruments and Methods in Physics Research Section A: Accelerators, Spectrometers, Detectors and Associated Equipment, pp. 304-312, Mar. 2002, 9 pgs.

Roquemore, et al., "TFTR multichannel neutron collimator", Review of Scientific Instruments, pp. 3163-3165, May 1990, 4 pgs.

Sarenac, et al., "Generation and detection of spin-orbit coupled neutron beams", PNAS, www.pnas.org/cgi/doi/10.1073/pnas.1906861116, Aug. 30, 2019, 5 pgs.

Sarenac, et al., "Generation of a Lattice of Spin-Orbit Beams via Coherent Averaging", Physical Review Letters 121, 183602, Oct. 30, 2018, 6 pgs.

Sarenac, et al., "Methods for preparation and detection of neutron spin-orbit states", New Journal of Physics 20 103012, Oct. 10, 2018, 13 pgs.

Soller, "A New Precision X-Ray Spectrometer", Physical Review, p. 158, 1924, 10 pgs.

Tremsin, et al., "Very Compact High Performance Microchannel Plate Thermal Neutron Collimators", IEEE Transactions on Nuclear Science, pp. 1020-1024, Jun. 2004, 5 pgs.

WIPO, International Search Report and Written Opinion dated Apr. 23, 2020, in PCT/CA2020/050080, 8 pgs.

Aswal, et al., "Characterisation of the polarised neutron beam at a small angle scattering instrument SANS-I with a polarised proton target", Nuclear Instruments and Methods in Physics Research Section A, Dec. 14, 2007, 5 pgs.

Schulz, et al., "Comparison of Polarizers for Neutron Radiography", Journal of Physics: Conference Series vol. 251, No. 1, 2010, 6 pgs.

* cited by examiner

COLLIMATOR SYSTEM

CROSS-REFERENCE TO RELATED APPLICATIONS

This application claims priority to U.S. Provisional Application No. 62/796,377, filed Jan. 24, 2019 and entitled "Collimator System," which is hereby incorporated by reference.

BACKGROUND

The following description relates to collimating a beam.

Söller collimators have been used in conventional systems to collimate beams of neutrons and x-rays. A typical Söller collimator consists of a number of thin parallel plates (often referred to as "Söller slits") that are fabricated out of neutron (or x-ray) transmitting material and coated with a neutron (or x-ray) absorber material. For example, a Söller collimator for neutrons may be achieved by stacking single crystal silicon wafers coated with gadolinium. Extensions have been demonstrated such as a 2D design using microchannel plates, a Söller collimator based on a honeycomb design, and a multichannel collimator design. In these conventional designs, the length and the spacing of the Söller slits determine the amount of beam collimation.

DETAILED DESCRIPTION

In some aspects of what is described here, a collimation process includes preparing a beam in a well-defined polarization state, mapping the transverse momentum onto polarization, and polarization-filtering the beam to obtain a collimated neutron beam. In some examples, such a process may be implemented by a collimator system that includes a polarizer, and a collimator subsystem. In some instances, the collimator subsystem includes a gradient system, and an analyzer. In various applications, the collimator systems can be implemented as a neutron collimator (that collimates neutron beams), as a photon collimator (that collimates photon beams), or as another type of collimator. The collimator system can collimate a beam based on mapping the transverse momentum onto polarization, and polarization-filtering the beam.

In some implementations, the collimator systems and techniques described here can be used in neutron radiography. For example, the collimator systems and techniques described here may be used to improve or otherwise modify existing neutron imaging techniques to allow real-time neutron imaging with high spatial-temporal resolutions at low cost in applications such as, for example defect detection, medical imaging, and materials characterization.

Further, in some implementations, the collimator systems and techniques described here can provide several important advantages and improvements over conventional approaches. In some cases, a higher intensity output is produced (e.g., compared to some conventional collimators). For instance, a larger portion of the beam intensity may be preserved compared to conventional systems (e.g., compared to Söller collimators that remove a large portion of the desired beam intensity), resulting in a collimated beam of higher intensity. In some cases, the systems and techniques described here can be used for in-situ variable collimation and may be adapted for various types of particle beams and photon beams.

Figure 1A:
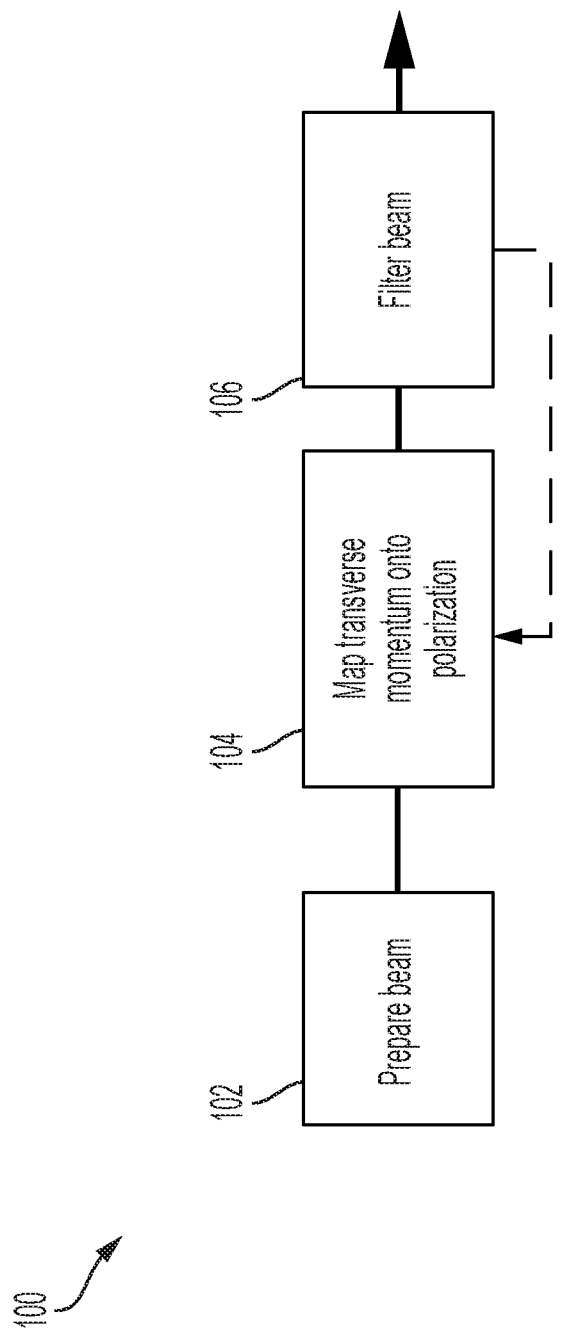
FIG. 1A is a flow diagram showing aspects of an example collimation process.

FIG. 1A is a flow diagram showing aspects of an example collimation process 100. The example collimation process 100 can be performed, for example, by a collimator system. For instance, operations in the collimation process 100 may be performed or implemented using the components in the collimator systems 200, 400 and 600 shown in FIGS. 2, 4, and 6, or another type of system. The example process 100 may include additional or different operations, including operations performed by additional or different components, and the operations may be performed in the order shown or in another order.

At 102, a beam is prepared. In some implementations, the beam may contain particles such as neutrons, photons or other particles. In some cases, the beam is nonpolarized. In some implementations, the beam is prepared or modified during operation 102 to have a well-defined polarization state. For example, the beam may be prepared by passing an input beam through a polarizer. In some examples, the polarizer may contain a spin filter for neutrons or an optical polarizer for photons. In certain examples, the polarizer converts the beam to a polarized beam by filtering out particles that have polarization directions not aligned with the polarization direction of the polarizer. In some implementations, the beam exiting the polarizer may have a well-defined polarization state.

Figure 2:
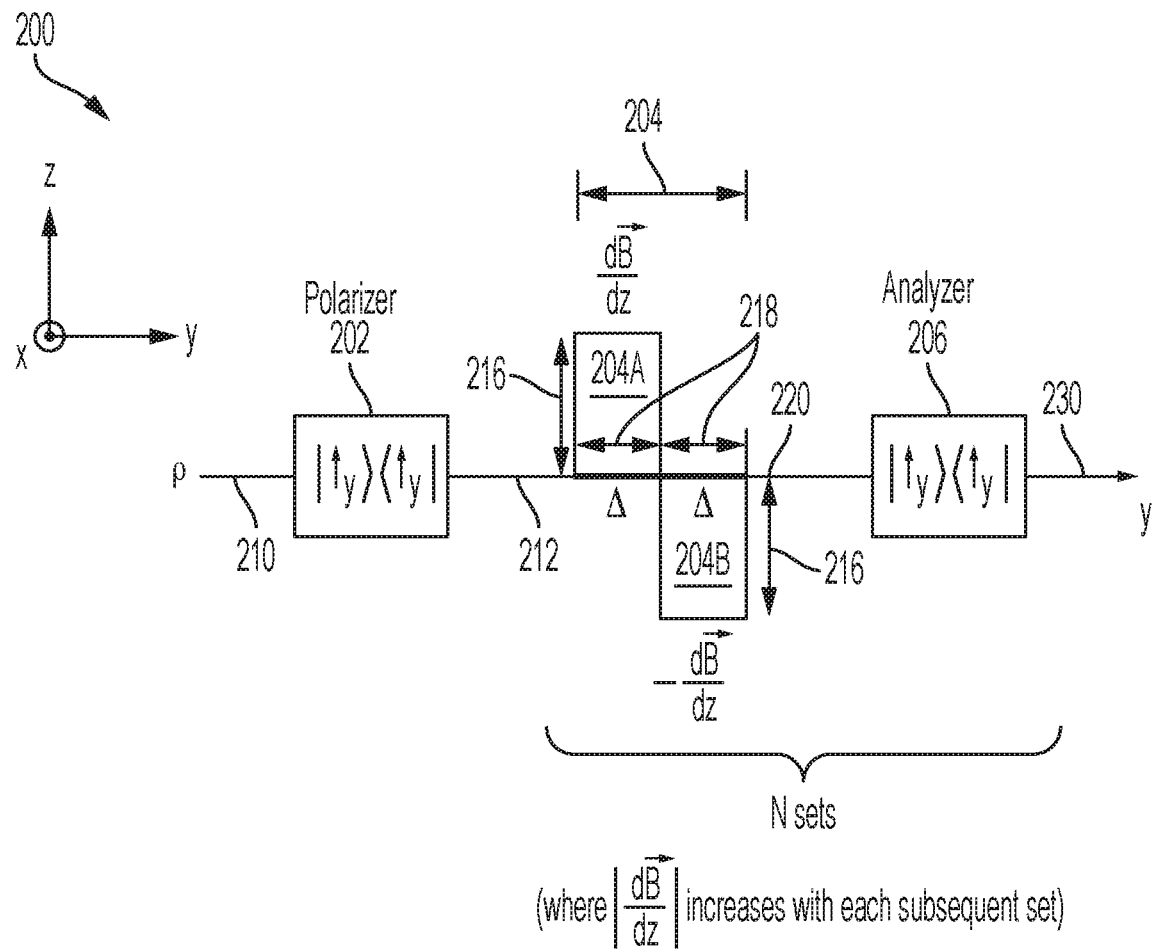
FIG. 2 is a schematic diagram showing an example neutron beam collimator system.
Figure 4:
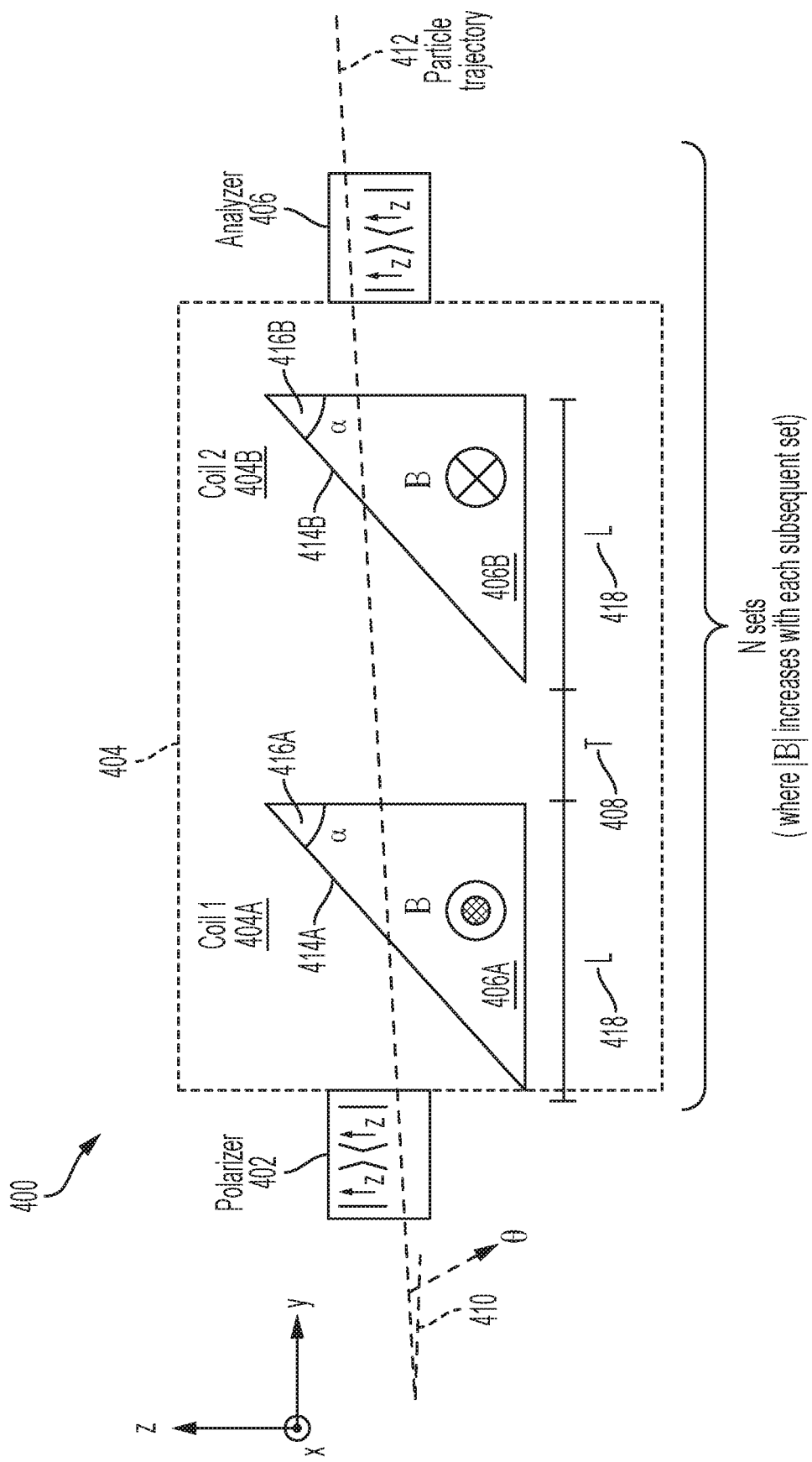
FIG. 4 is a schematic diagram showing another example neutron beam collimator system.
Figure 6:
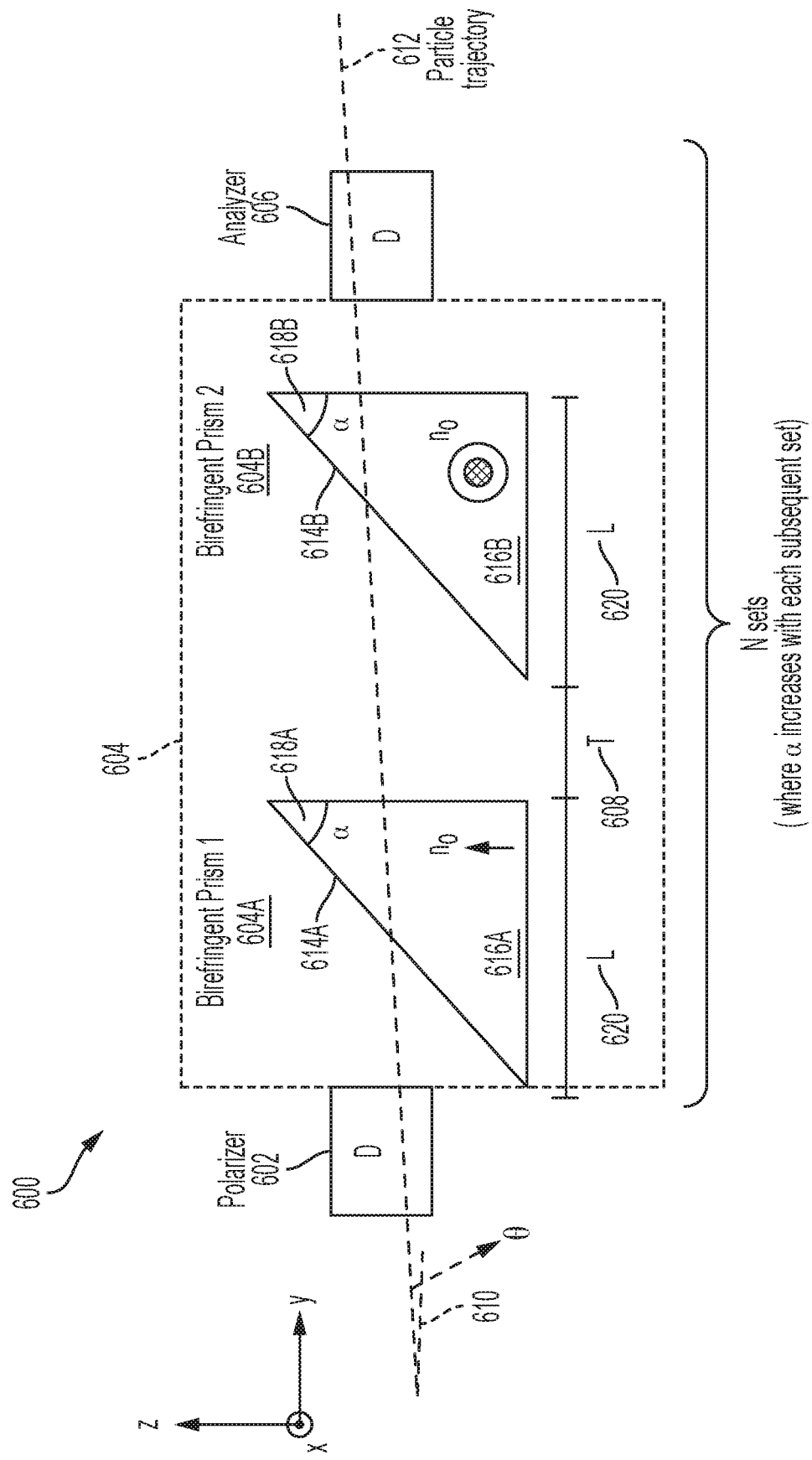
FIG. 6 is a schematic diagram showing an example photon beam collimator system.

At 104, transverse momentum of particles in the beam is mapped onto polarization degrees of freedom of the particles. The divergence angle of the beam is determined by the transverse momentum distribution of the particles in the beam. Here, the transverse momentum of a particle is the component of momentum that is perpendicular to the primary propagation direction of the beam. In some implementations, the polarization state of the particles with non-zero transverse momentum may be modified during operation 104 by introducing a phase shift to the polarization degree of freedom of the respective particle. In some examples, the phase shift to the polarization degree of freedom of a respective particle in the beam is directly proportional to the transverse momentum of the respective particle in the beam. In some examples, operation 104 may be performed by a gradient system which may be implemented by various techniques in order to introduce a phase shift to the polarization degree of freedom that is proportional to the transverse momentum. In some implementations, the gradient system may be implemented by a sequence of magnetic field gradients 204 as shown in FIG. 2, a pair of triangular coils 404 as shown in FIG. 4, or a pair of birefringent prisms 604 as shown in FIG. 6.

At 106, the beam is then filtered. In some implementations, the beam of particles with phase shifts to the polarization degree of freedom may be further filtered to produce a collimated beam. In certain implementations, the modified beam may be polarization filtered by an analyzer. In some examples, the analyzer may contain a spin filter for neutrons or an optical polarizer for photons. In some instances, the analyzer may filter out particles (neutrons or photons) with polarization directions different from the polarization direction set by the analyzer. In some implementations, the analyzer for polarization filtering the beam and the polarizer for preparing the beam before and after the gradient system may have the same polarization direction.

In some implementations, operations 104 and 106 collimate the beam prepared at operation 102 by producing an output beam having a lower beam divergence than the input beam. Furthermore, operations 104 and 106 may be repeated in a similar manner to further reduce the beam divergence. In this case, phase shifts introduced to the particles in the beam may be increased in subsequent operations 104 to further reduce the beam divergence producing a further collimated beam. For example, increased phase shifts may be produced by increasing the magnitude of the magnetic field gradients in subsequent sequences of magnetic field gradients, increasing the magnitude of the magnetic field in subsequent pairs of triangular coils, or increasing the inclined angle of birefringent prims in subsequent pairs of birefringent prisms.

The output beam after the collimation process 100 may be used in other systems or devices. For example, the output beam may be used in experiments or other types of applications. Generally, the degree to which a beam is collimated may determine the signal-to-noise ratio when the beam is used in experiments, so a more collimated beam will generally produce a stronger signal and higher resolution in an experiment.

Figure 1B:
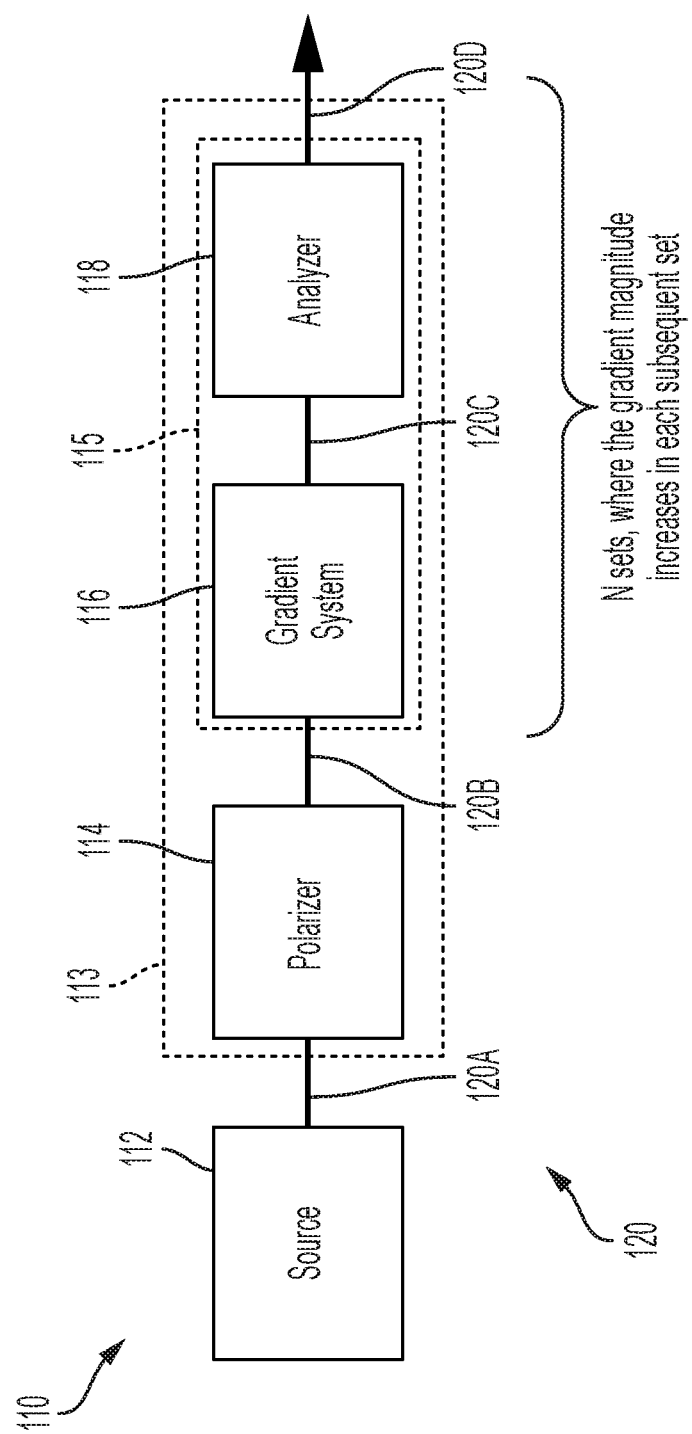
FIG. 1B is a block diagram showing an example collimator system.

FIG. 1B is a block diagram showing an example collimator system 110. The example collimator system 110, which may be used to produce a collimated beam, includes a source 112 and a collimator 113. The system 110 may include additional or different components and features.

As shown in FIG. 1B, the collimator 113 collimates a beam on a beam path 120. The beam is initially produced from the source 112 on a first portion 120A of the beam path 120. In some examples, the source 112 is a neutron beam source (e.g., a nuclear reactor or another type of neutron beam source) that produces a neutron beam, which the collimator 113 receives as input. In some examples, the source 112 is a photon source (e.g., an x-ray source or another type of electromagnetic wave source) that produces a photon beam, which the collimator 113 receives as input.

The example collimator 113 shown in FIG. 1B includes a polarizer 114, and a collimator subsystem 115. As shown in FIG. 1B, the polarizer 114 receives the beam from the first portion 120A of the beam path 120 and prepares the beam in a well-defined polarization state. In some implementations, the polarizer 114 is configured to polarize a beam on the first portion 120A which has a first beam divergence. In some implementations, after the polarized beam is produced from the polarizer 114 on a second portion 120B of the beam path 120, the polarized beam is then processed by the one or more sets of collimator subsystems 115.

In some implementations, the collimator subsystem 115 is configured to obtain a collimated neutron beam on a fourth portion 120D with a second beam divergence. In some implementations, the collimator subsystem 115 may include a gradient system 116 and an analyzer 118. As shown in FIG. 1B, the gradient system 116 receives the polarized beam from the second portion 120B of the beam path 120 and applies one or more gradient fields to the polarized beam. In some implementations, the gradient fields induce a phase shift to the polarization degree of freedom, that is directly proportional to the transverse momentum. In some implementations, a modified beam (as modified by the gradient system 116) is produced from the gradient system 116 on a third portion 120C of the beam path 120. In some implementations, the modified beam on the third portion 120C of the beam path 120 may possess a non-uniform polarization. In some instances, the analyzer 118 receives the modified beam from the third portion 120C of the beam path 120 and processes the beam. In some implementations, the beam (as modified by the analyzer 118) may become polarized after passing through the analyzer 118 on a fourth portion 120D of the beam path 120.

In some implementations, the collimator 113 may continue processing the beam in a similar manner with additional sets of collimator subsystems 115 (e.g., N>1). As shown in FIG. 1B, the collimator 113 may include a series (e.g., N sets) of the collimator subsystems 115 (where N is an integer greater than or equal to 1). For instance, when N=2, the collimator 113 includes a first collimator subsystem 115 (e.g., including a first gradient system 116 followed by a first analyzer 118) followed by a second collimator subsystem 115 (e.g., including a second gradient system 116 followed by a second analyzer 118). In some implementations, the sequence of collimator subsystems 115 may continue accordingly for higher values of N. In such cases (N>1), the magnitude of the gradient strength may increase in each subsequent gradient system 116 of each subsequent collimator subsystem 115. In some examples, the collimator 113 may include additional or different components, and the components may be arranged as shown in FIG. 1B or in another manner.

The output beam produced by the collimator 113 may be used in other systems or devices. For example, the output beam may be used in experiments or other types of applications. Generally, the degree to which a beam is collimated may determine the signal-to-noise ratio when the beam is used in experiments, so a more collimated beam will generally produce a stronger signal in an experiment.

Example implementations of the collimator 113 shown in FIG. 1B are provided in FIGS. 2, 4 and 6. As shown by the examples, the polarizer 114 in FIG. 1B may be implemented by a spin filter or an optical polarizer; the gradient system 116 in FIG. 1B may be implemented by a sequence of magnetic field gradients, a pair of triangular coils, or a pair of birefringent prisms; and the analyzer 118 in FIG. 1B may be implemented by a spin filter or an optical polarizer. The polarizer 114, the gradient system 116, and the analyzer 118 may be implemented in another manner, for example, by other types of components.

FIG. 2 is a schematic diagram showing an example neutron beam collimator system 200. The example neutron beam collimator system 200 can be used, for example, to collimate an input neutron beam from a neutron source. In the example shown in FIG. 2, the neutron beam collimator system 200 receives the input neutron beam with input state $\rho$, filters out a particular polarization state (e.g., spin state), and produces a collimated neutron beam with a particular output state. In some examples, the input state $\rho$ may contain any state information of neutrons in the input neutron beam such as, for example direction, velocity and spin. The output neutron beam after passing through the example neutron beam collimator system 200 is a polarized and collimated neutron beam, which has a narrower beam divergence angle ($\theta$) than that of the input neutron beam.

In the example shown in FIG. 2, the neutron beam collimator system 200 includes a polarizer 202, a sequence of magnetic field gradients 204, and an analyzer 206. In some examples, the polarizer 202 and the analyzer 206 may include a spin polarizer and a spin analyzer, respectively. In some implementations, the polarizer 202 and analyzer 206 may have the same polarization direction. In the example shown in FIG. 2, the polarization directions ($|\uparrow_y\rangle\langle\uparrow_y|$) of the polarizer 202 and the analyzer 206 are both configured along the $\vec{y}$ axis, such that they produce an output beam that is polarized along the $\vec{y}$ direction.

Figure 3:
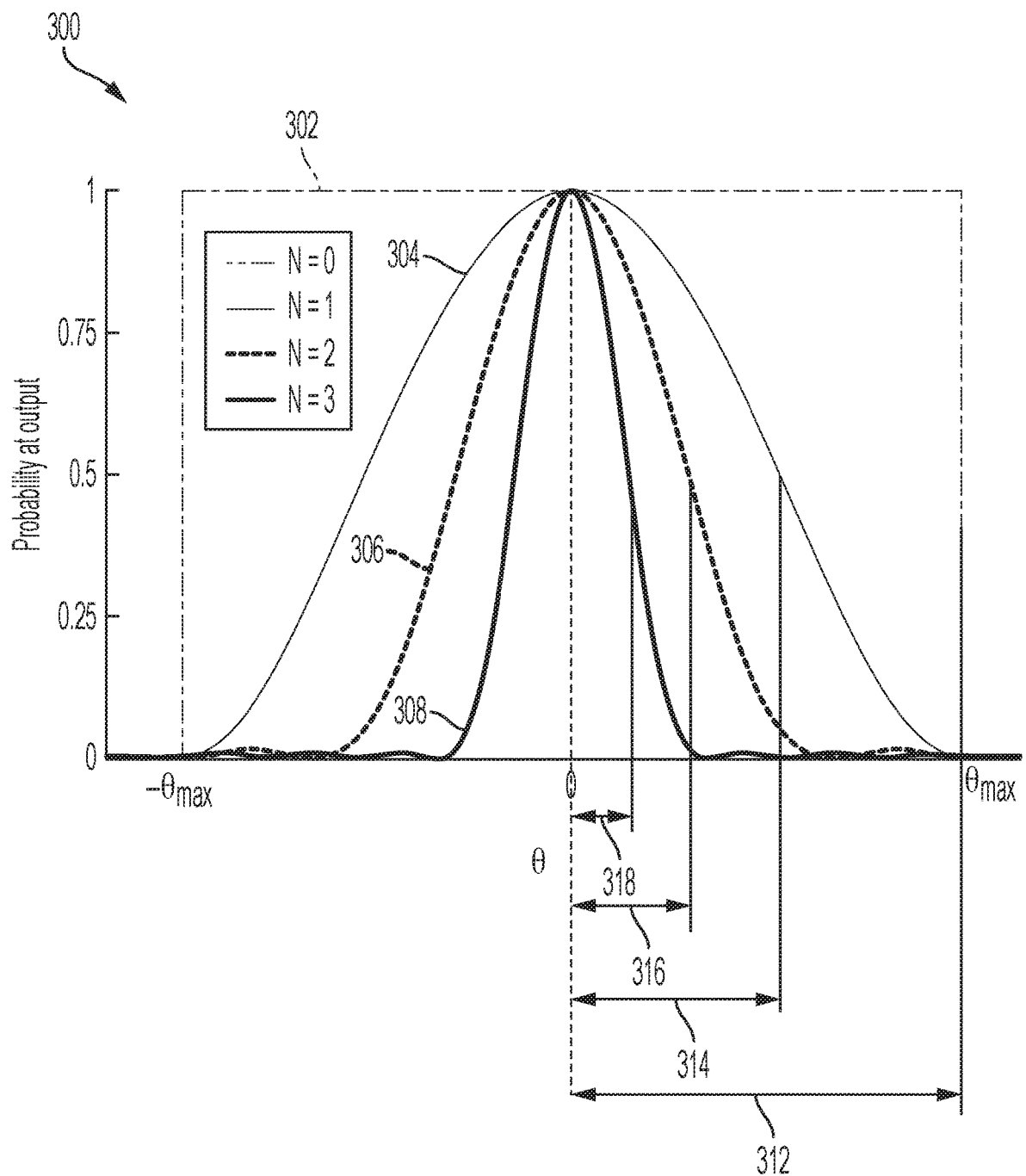
FIG. 3 is a plot showing computed probabilities for the output neutron beam of the example neutron collimator system shown in FIG. 2.

In some implementations, the polarizer 202 receives an input neutron beam 210 from a neutron generator (not shown), which emits neutrons. In certain implementations, the input neutron beam 210 contains a stream of free neutrons, which may be used for various applications, for example, in physics, chemistry and biology applications. In some examples, the input neutron beam 210 is nonpolarized and may have a first beam divergence angle ($\theta_1$). In some cases, the beam divergence angle can be measured by the angular distribution of the neutron beam. In some examples, the angular distribution of the neutron beam is a Gaussian and the beam divergence angle is measured as the half width at half maximum (HWHM). Examples of the distribution of neutron divergence angles are shown in FIG. 3.

In some implementations, the polarizer 202 may include a polarizing filter, a polarizing reflector, a polarizing crystal or another type of polarizer. In certain implementations, the polarizer 202 is a polarizing filter that includes a transmission spin filter, which may contain nuclear spin-polarized $^3$He. In certain implementations, the polarizer 202 may contain a polarizing neutron reflector. In some implementations, a polarizing neutron reflector is a neutron optical device utilizing total reflection from the interface between vacuum and a coherently scattering medium. In some implementations, a neutron reflector may be implemented using a polarizing neutron mirror or a supermirror. In some instances, free neutrons in a neutron beam with spin direction parallel to the inner magnetic field of the reflector may be reflected and other neutrons in the neutron beam with spin directions anti-parallel to the magnetic field may be transmitted. In certain implementations, the polarizer 202 may contain a polarizing single crystal. In some instances, the polarizing single crystal may include a magnetized single crystal including ferromagnetic semiconducting materials, metal alloys, and other suitable materials.

In the example shown in FIG. 2, the input neutron beam 210, which is nonpolarized, after passing through the polarizer 202, becomes polarized. The polarizer 202 converts the nonpolarized neutron beam 210 to a polarized neutron beam 212 by filtering out neutrons that have spin directions not aligned with the polarization direction ($|\uparrow_y\rangle\langle\uparrow_y|$) of the polarizer 202. In some examples, the polarized neutron beam 212 may only contain neutrons with spin directions aligned with the polarization direction ($|\uparrow_y\rangle\langle\uparrow_y|$) set by the polarizer 202. In some examples, the polarized neutron beam 212 may have a second beam divergence angle ($\theta_2$). In some cases, the second beam divergence angle of the polarized neutron beam 212 exiting the polarizer 202 may equal to the first beam divergence angle of the nonpolarized input neutron beam 210.

In the example collimator system 200 of FIG. 2, the sequence of magnetic field gradients 204 includes a first region 204A and a second region 204B. In some instances, the sequence of magnetic field gradients 204 may be positioned immediately after the polarizer 202 or separated from the polarizer 202 by a distance. In some implementations, each of the first and second regions 204A, 204B may contain a magnetic field strength that varies with respect to position. In the example shown in FIG. 2, the first region 204A may contain a magnetic field along the $+\vec{x}$-axis with increasing magnetic field strength along the $+\vec{z}$-axis creating a first magnetic field gradient $$\left(\frac{d\vec{B}}{dz}\right)$$

having a first gradient orientation along the $+\vec{z}$ direction perpendicular to the beam incident direction ($+\vec{y}$) and a first gradient magnitude $$\left|\frac{d\vec{B}}{dz}\right|.$$

The second region 204B may contain magnetic field along the $\vec{x}$-axis with increasing magnetic field strength along the $-\vec{z}$-axis creating a second magnetic field gradient $$\left(-\frac{d\vec{B}}{dz}\right)$$

having a second gradient orientation along the $-\vec{z}$ direction perpendicular to the beam incident direction ($+\vec{y}$) and a second gradient magnitude $$\left|\frac{d\vec{B}}{dz}\right|.$$

The example sequence of magnetic field gradients 204 shown in FIG. 2 collimates the neutron beam on the y-z plane, e.g., reducing the beam divergence angle on the y-z plane.

In some implementations, the first and second region 204A, 204B may have the same width 218 along the beam incident direction ($+\vec{y}$). In some instances, the gradient magnitude of each of the first and second magnetic field gradients in the first and second region 204A, 204B, respectively, may be a constant, e.g., the first gradient magnitude $$\left|\frac{d\vec{B}}{dz}\right|$$

is uniform along the $\vec{y}$-axis in the first region 204A, and the second gradient magnitude $$\left|\frac{d\vec{B}}{dz}\right|$$

is uniform along the $\vec{y}$-axis in the second region 204B. In some instances, the gradient magnitude in each of the first and second regions 204A, 204B may vary along the $\vec{y}$-axis, e.g., linearly, polynomially, or in any other fashion. In some instances, the first and second magnetic field gradients are anti-parallel. For example, the first and second magnetic field gradients may have a same gradient magnitude 216 and may be arranged in opposite directions. In some implementations, the first and second magnetic field gradients are along a perpendicular direction relative to the polarization direction of the neutron beam ($\vec{x}$) and the beam incident direction ($+\vec{y}$). In some implementations, the gradient magnitude 216 of the first and second magnetic field gradients in the sequence of magnetic field gradients 204 are determined by the velocity of the neutrons in the polarized neutron beam 212 and the width of the first and second regions 204A, 204B. In some implementations, the sequence of magnetic field gradients 204 in the neutron collimator system 200 may be implemented using a Stern-Gerlach apparatus, a Halbach array with special arrangement of permanent magnets or another type of system.

In some implementations, the first and second regions 204A, 204B may be positioned one after another without any spatial separation. In some implementations, the sequence of magnetic field gradients 204 is positioned adjacent to the polarizer 202. In some implementations, the first and second regions 204A, 204B in the example neutron collimator system 200 can be implemented in various configurations and arrangements. For example, the first and second regions 204A, 204B may be: separated by a distance (D) in which there is no magnetic field, or where the magnetic field path integral is negligible; separated by a distance (D) in which there is a magnetic field along the direction of either magnetic field gradients; separated by distance (D) in which there is a magnetic field along the direction of the incoming spin such that the spin undergoes a 2π rotation; or arranged in another configuration.

In some implementations, the first and second magnetic fields in the first and second region 204A, 204B may be oriented along different directions to provide collimation to the neutron beam on a different plane. For example, the first region 204A may contain a magnetic field along the $+\vec{z}$-axis with increasing magnetic field strength along the $+\vec{x}$-axis creating a first magnetic field gradient $$\left(\frac{d\vec{B}}{dx}\right)$$

along the $+\vec{x}$ direction perpendicular to the beam incident direction ($+\vec{y}$). The second region 204B may contain magnetic field along the $\vec{z}$-axis with increasing magnetic field strength along the $-\vec{x}$-axis creating a second magnetic field gradient $$\left(-\frac{d\vec{B}}{dx}\right)$$

along the $-\vec{x}$ direction perpendicular to the beam incident direction ($+\vec{y}$). In this case, the sequence of magnetic field gradients 204, when oriented in alternative directions may be used to collimate the neutron beam on the $\vec{y}$-$\vec{x}$ plane, e.g., reducing the beam divergence angle on the $\vec{y}$-$\vec{x}$ plane. In some cases, one or more of the components may be oriented or combined in another manner to achieve 2-dimensional collimation.

In some aspects of operation, the first and second magnetic field gradients in the example neutron beam collimator system 200 may induce a phase shift (β) on the spin degree of freedom that is independent of the particle location in the beam, and is directly proportional to the transverse momentum of each neutron:

$$\beta = \frac{2m\gamma \left|\frac{dB}{dz}\right| \Delta^2 k_\perp}{\hbar k_z^2} = \frac{2\gamma \left|\frac{dB}{dz}\right| \Delta^2 \tan[\theta]}{v}$$

where γ is the gyromagnetic ratio of a neutron, $$\left|\frac{dB}{dz}\right|$$

is the gradient magnitude of the magnetic field gradients, Δ is the length of the magnetic field gradient, θ=ArcTan[$k_\perp/k_z$] is the transverse propagation angle of the incoming neutron, m is the neutron mass, $k_\perp$ is the neutron's transverse wavevector, $k_z$ is the neutron wave vector, and v is the neutron velocity. In this example, the magnetic field gradients have respective gradient orientations along the $\vec{z}$-direction. In some examples, the transverse momentum is related to the transverse wavevector ($k_\perp$). In some implementations, the first and second regions 204A, 204B may introduce a phase shift on the spin degree of freedom to neutrons that have a non-zero transverse propagation angle. As shown in the equation above, the greater the transverse propagation angle of a neutron is, the greater the phase shift can be introduced to the spin degree of freedom of the neutron. In some examples, the neutron beam 220 may have a third beam divergence angle ($\theta_3$). In some cases, the third beam divergence angle of the neutron beam 220 may be equal to the second beam divergence angle of the polarized neutron beam 212.

In the example shown in FIG. 2, the neutron beam 220 further passes through an analyzer 206. In some implementations, the analyzer 206 is identical to the polarizer 202, which may be polarizing filters, polarizing reflectors, or polarizing crystals. During operation, the analyzer 206 may filter out neutrons with a probability proportional to the phase shift introduced by the sequence of magnetic field gradients 204. For example, after traveling through the sequence of magnetic field gradients 204 the neutrons with non-zero transverse momentum may obtain a greater phase shift to the spin degree of freedom and may be filtered out by the analyzer 206. In some examples, the output neutron beam 230 may have a fourth beam divergence angle ($\theta_4$). In some cases, the fourth beam divergence angle of the output neutron beam 230 may be less than the first beam divergence angle of the nonpolarized neutron beam 210.

As shown in FIG. 2, the sequence of magnetic field gradients 204 and the analyzer 206 can be repeated to increase the level of collimation. For example, the sequence of magnetic field gradients 204 and the analyzer 206 can be repeated N times, in which N is an integer and N≥2. In some implementations, the magnetic field gradients in the sequential sets may increase as N increases. In some implementations, the greater the magnetic field gradient is, the greater the phase shift may be introduced to the neutrons with non-zero transverse momentum (e.g., non-zero transverse wavevector). In this case, the beam divergence angle of the output beam 230 may be further reduced.

FIG. 3 is a plot 300 showing computed probabilities in the output neutron beam 230 of the example neutron collimator system 200 shown in FIG. 2. FIG. 3 describes a distribution of neutrons in the example output neutron beam 230. The horizontal axis in the plot 300 represents a range of transverse divergence angles ($\theta$) of neutrons in a neutron beam, and the vertical axis in the plot 300 represents a range of probabilities. In some examples, the beam divergence angle can be measured by the half-width at half maximum (HWHM) value of the corresponding distribution curve. The simulation was done with ideal components and all of the constants set to 1. For a practical simulation the magnetic field gradient would need to be tuned according to the experimental parameters and the desired angular distribution.

As shown in FIG. 3, the first curve 302 represents the input neutron beam 210 from a neutron source in the example neutron collimator system 200 shown in FIG. 2. In some implementations, the input neutron beam 210 may have a uniform probability distribution over the range of divergence angles centered about $\theta=0$ between a minimum orientation $-\theta_{max}$ and maximum orientation $\theta_{max}$, e.g., a first beam divergence angle. The second curve 304 represents the output neutron beam 230 after a first collimator subsystem, which includes a first sequence of magnetic field gradients and a first analyzer (e.g., after N=1). In some implementations, the output neutron beam 230 is collimated, having a narrowed probability distribution and a second beam divergence. In the example show in FIG. 3, the second beam divergence angle 314 of the neutron beam after the first sequence of magnetic field gradients and analyzer is less than the first beam divergence angle 312 of the input neutron beam.

The third curve 306 represents the output neutron beam 230 after a second collimator subsystem, which includes a second sequence of magnetic field gradients and a second analyzer (e.g., after N=2). The fourth curve 308 represents the output neutron beam 230 after a third collimator subsystem, which includes a third sequence of magnetic field gradients and a third analyzer (e.g., after N=3). In some implementations, the output neutron beam after passing multiple collimator subsystems can be further collimated. For example, the output neutron beam may have a third beam divergence angle after the second collimator subsystem and a fourth beam divergence angle after the third collimator subsystem. As shown in FIG. 3, the third beam divergence angle 316 of the neutron beam after the second collimator subsystem is less than the second beam divergence angle 314 of the neutron beam after the first collimator subsystem. The fourth beam divergence angle 318 of the neutron beam after the third collimator subsystem is less than the third beam divergence angle 316 of the neutron beam after the second collimator subsystem.

FIG. 4 is a schematic diagram showing an example neutron beam collimator system 400. The example neutron beam collimator system 400 can be used, for example, to collimate an input neutron beam from a neutron source. In the example shown in FIG. 4, the neutron beam collimator system 400 receives the input neutron beam, filters out a particular spin state, and produces a collimated neutron beam from the polarized beam. The input neutron beam having a beam divergence angle ($\theta$) without passing through the example neutron beam collimator system 400 may include a particle trajectory 412. The output neutron beam after passing through the example neutron beam collimator system 400 becomes a polarized and collimated neutron beam, which has a narrower beam divergence angle than that of the input neutron beam.

In the example shown in FIG. 4, the neutron beam collimator system 400 includes a polarizer 402, a pair of triangular coils 404, and an analyzer 406. In some examples, the polarizer 402 and the analyzer 406 may include a spin polarizer and a spin analyzer, respectively. In some implementations, the polarizer 402 and analyzer 406 may have the same polarization direction. In the example shown in FIG. 4, the polarization directions ($|\uparrow_z\rangle\langle\uparrow_z|$) of the polarizer 402 and the analyzer 406 are both configured along the $\vec{z}$-axis.

Figure 5:
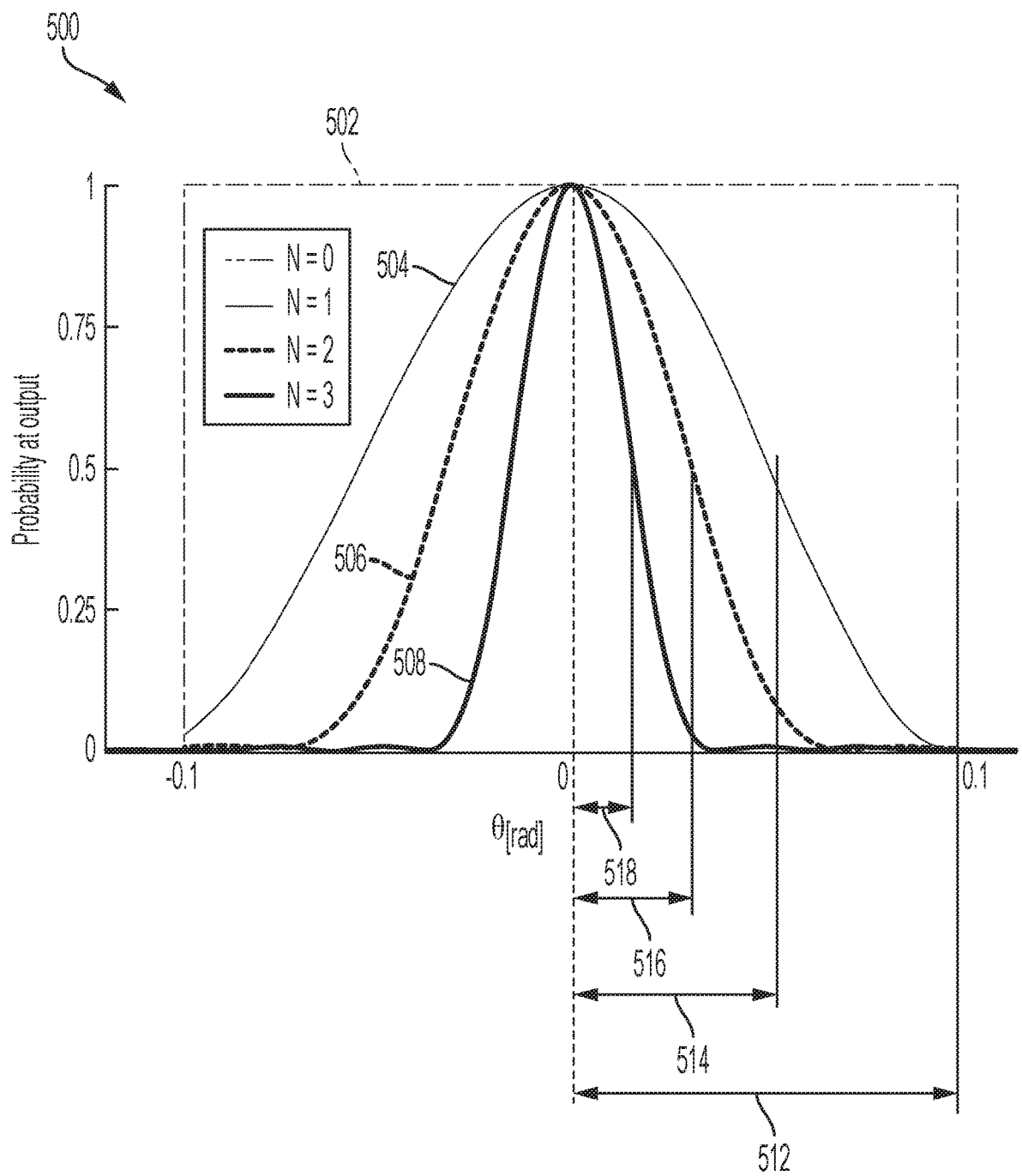
FIG. 5 is a plot showing computed probabilities for the output beam of the example neutron collimator system shown in FIG. 4.

In some implementations, the polarizer 402 receives an input neutron beam 410 from a neutron generator (not shown). For example, the input neutron beam 410 in FIG. 4 can be of the same type as the input neutron beam 210 described with respect to FIG. 2. In some examples, the input neutron beam 410 is nonpolarized and may have a first beam divergence angle ($\theta_1$). Example distributions of neutron divergence angles are shown in FIG. 5.

In some implementations, the polarizer 402 may include one of a polarizing filter, a polarizing reflector, or a polarizing crystal. For example, the polarizer 402 in FIG. 4 can be of the same type as the polarizer 202 described with respect to FIG. 2

In the example shown in FIG. 4, the input neutron beam 410, which is nonpolarized, after passing through the polarizer 402, becomes polarized. The polarizer 402 converts the nonpolarized neutron beam 410 to a polarized neutron beam by filtering out neutrons that have spin directions not aligned with the polarization direction ($|\uparrow_z\rangle\langle\uparrow_z|$). In some examples, the polarized neutron beam exiting the polarizer 402 may only contain neutrons with spin directions aligned with the polarization direction ($|\uparrow_z\rangle\langle\uparrow_z|$) set by the polarizer 402. In some examples, the polarized neutron beam 412 may have a second beam divergence angle ($\theta_2$). In some cases, the second beam divergence angle of the polarized neutron beam exiting the polarizer 402 may equal to the first beam divergence angle of the nonpolarized input neutron beam 410.

In some implementations, the pair of triangular coils 404 may include a first triangular coil 404A and a second triangular coil 404B. In some implementations, the first triangular coil 404A and the second triangular coil 404B are identical, being separated by a distance (T) 408 along the beam incident direction ($\vec{y}$). In some instances, the first triangular coil 404A and the second triangular coil 404B are configured with inclined sides 414A, 414B facing the incoming neutron beam. In some cases, the identically configured triangular coils 404A, 404B may carry current in opposite directions to generate magnetic fields in anti-parallel directions. For example, the direction of the current in the first triangular coil 404A is counterclockwise and the direction of the current in the second triangular coil 404B is clockwise. In some instances, the cross section of each of the first and second triangular coils 404A, 404B along the $\vec{y}$-$\vec{z}$ plane is a right triangle with one of the sides parallel to the incident direction of the neutron beam ($\vec{y}$). In some cases, the first and second triangular coils 404A, 404B may be oriented or configured in another manner.

In some implementations, the first and second triangular coils 404A, 404B may be positioned immediately after the polarizer 402 or separated from the polarizer 402 by a distance. In some implementations, during operation, when current is applied, the first and second triangular coils 404A, 404B induce anti-parallel magnetic fields 406A, 406B (e.g., opposite field orientations) within the respective coils along the $\vec{z}$-direction perpendicular to the incident direction of the neutron beam ($\vec{y}$). In some cases, field strengths of each of the magnetic fields 406A, 406B are uniform within the respective coils.

In some implementations, the first and second triangular coils 404A, 404B are configured to produce a near zero magnetic field between the two triangular coils to ensure that the induced phase gradient in this region is negligible. In some implementations, a uniform magnetic field may be formed between the first and second triangular coils 404A, 404B to avoid introducing unnecessary phase gradient to the neutrons. In some instances, a uniform magnetic field may be implemented by a guide coil (not shown) between the two coils 404A, 404B.

In some implementations, the anti-parallel magnetic fields in the pair of triangular coils 404 may introduce phase shift on the spin degree of freedom of neutrons. The induced phase shift ($\beta$) is independent of the neutron location in the neutron beam, and is directly proportional to the transverse momentum of each neutron:

$$\beta = \frac{-\gamma B}{2v} \left( \frac{(L+T)\sin[\alpha]\tan[\theta]}{\cos[\alpha+\theta]} \right)$$

where $\gamma$ is the neutron gyromagnetic ratio, B is the field strength of the magnetic field in the coils, $\alpha$ is incline angle of the coils, $\theta$ is the divergence angle of the incoming neutron, and v is the neutron velocity. In some examples, the transverse momentum of a neutron is related to the transverse wavevector ($k_\perp$). During operation, when the polarized neutron beam 410 is received by the first triangular coil 404A at its inclined side 414A, neutrons that have non-zero transverse propagation angles may travel in the first magnetic field 406A for a different amount of time than in the second coil.

In some implementations, since the field strength of the magnetic fields within the first and second triangular coils 404A, 404B are the equal, the total phase shift after the two triangular coils is proportional to the difference in the amount of time that a neutron travels in the two triangular coils 404A, 404B. When a neutron with zero transverse divergence angle and thus zero transverse momentum goes straight along the incident direction of the neutron beam ($\vec{y}$), e.g., perpendicular to the polarization direction ($\vec{z}$), the time that the neutron travels in the first and second triangular coils 404A, 404B are equal resulting in a zero total phase shift to its spin degree of freedom. When a neutron with a non-zero transverse divergence angle and thus non-zero transverse momentum travels through the pair of triangular coils 404 with an angle, e.g., along the particle trajectory 412 shown in FIG. 4, the time that the neutron travels in the first and second triangular coils 404A, 404B are different causing a non-zero total phase shift. For example, the time that a neutron travels in the first triangular coil 404A may be greater than the time that the neutron travels in the second triangular coil 404B. Consequently, the neutron beam after passing through the pair of triangular coils 404 may become non-uniformly polarized.

In some implementations, the neutron beam further passes through an analyzer 406. In some implementations, the analyzer 406 is identical to the polarizer 402, which may be polarizing filters, polarizing reflectors, or polarizing crystals. In some implementations, during operation, the analyzer 406 may filter out neutrons on which the phase shift is introduced by the pair of triangular coils 404. For examples, neutrons that are angled away from the $\vec{y}$-axis after traveling through the pair of triangular coils 404 may obtain a greater phase shift to their spin degree of freedom and may be filtered out by the analyzer 406. In some examples, the output neutron beam exiting the analyzer 406 may be polarized and have a second beam divergence angle ($\theta_2$). In some cases, the second beam divergence angle of the output neutron beam may be less than the first beam divergence angle of the nonpolarized neutron beam 410.

As shown in FIG. 4, the pair of triangular coils 404 and the analyzer 406 can be repeated to increase the level of collimation. For example, the pair of triangular coils 404 and the analyzer 406 can be repeated N times, in which N is an integer and N≥2. In some implementations, the field strength of each of the magnetic fields created within the triangular coils in the sequential pairs may increase as N increases. In some implementations, the greater the field strength is, the greater the phase shift to the neutrons with non-zero transverse propagation angle can be introduced. In this case, the beam divergence angle of the output beam 230 may be further reduced. The distributions of neutrons in the input (N=0) and output neutron beam (for N=1,2,3 copies with optimized magnetic field) are shown in FIG. 5.

FIG. 5 is a plot 500 showing computed probabilities in the output beam of the example neutron collimator system 400 shown in FIG. 4. The horizontal axis in the plot 500 in FIG. 5 represents a range of transverse divergence angles of neutrons in a neutron beam, and the vertical axis in the plot 500 represents a range of probabilities. In some examples, the beam divergence angle can be measured by the half-width at half maximum (HWHM) value. The simulation was performed using ideal components and all of the constants set to 1. For a practical simulation the magnetic fields in the triangular coils would need to be tuned according to the experimental parameters and the desired angular distribution.

The first curve 502 in the example shown in FIG. 5 represents an example distribution of neutrons in the input neutron beam 410 in the example neutron collimator system 400 shown in FIG. 4. The input state has a uniform probability distribution over the range of transverse divergence angles centered about $\theta=0$ between −0.1 radians and 0.1 radians. The input neutron beam has a first beam divergence angle 512. The second curve 504 represents the state of the neutron beam after a first collimator subsystem (e.g., N=1) including a first pair of triangular coils 404 and a first analyzer 406. The state represented by the second curve 504 is collimated, having a narrowed probability distribution over a smaller range of transverse divergence angles of neutrons compared to the input neutron beam, e.g., a second beam divergence angle 514. The second beam divergence angle 514 of the neutron beam after passing through the first collimator subsystem is less than the first beam divergence angle 512 of the input neutron beam. In the example, the distribution of the neutrons represented by the second curve 504 is slightly asymmetric.

The third curve 506 in the example shown in FIG. 5 represents a distribution of neutrons in a neutron beam after a second collimator subsystem, which includes a second pair of triangular coils and a second analyzer (e.g., N=2). In some implementations, the output neutron beam after passing through the second collimator subsystem may have a third beam divergence angle. And the fourth curve 508 represents a distribution of neutrons in the neutron beam after a third collimator subsystem, which includes a third pair of triangular coils and a third analyzer (e.g, N=3). In some implementations, the output neutron beam after passing through the third collimator subsystem may have a fourth beam divergence angle. As shown in FIG. 5, the beams represented by the third and fourth curves 506, 508 are further collimated by the second and third collimator subsystems, having successively narrow probability distributions over successively smaller ranges of transverse divergence angles of neutrons compared to the prior states. The third beam divergence angle 516 of the neutron beam after the second collimator subsystem is less than the second beam divergence angle 514 of the neutron beam after the first collimator subsystem. The fourth beam divergence angle 518 of the neutron beam after the third collimator subsystem is less than the third beam divergence angle 516 of the neutron beam after the second collimator subsystem.

FIG. 6 is a schematic diagram showing an example photon beam collimator system 600. The example photon beam collimator system 600 can be used, for example, to collimate a photon beam from a radiation source (e.g., an x-ray source). In the example shown in FIG. 6, the photon beam collimator system 600 receives the input photon beam, filters out a particular polarization state, and produces a collimated photon beam. The input photon beam having a beam divergence angle (θ) before passing through the example photon beam collimator system 600 may have a particle trajectory 612. The output photon beam after passing through the example photon beam collimator system 600 becomes a polarized and collimated photon beam, which has a narrower beam divergence angle than that of the input photon beam.

In some implementations, the isomorphism between the spin-½ of fermions and the polarization state of photons allows the collimator principle from FIG. 1B to be implemented for photons. For example, the spin-½ states $\{\uparrow_z, \downarrow_z, \uparrow_x, \downarrow_x, \uparrow_y, \downarrow_y\}$ can be mapped to the corresponding photon polarization states $\{R, L, H, V, V, D, A\}$, and a sequence of components can be used to collimate a photon beam. This type of photon beam collimator may have applications, for example, with x-rays and other types of electromagnetic radiation.

In the example shown in FIG. 6, the photon beam collimator system 600 includes a polarizer 602, a pair of birefringent prisms 604, and an analyzer 606. In some examples, each of the polarizer 602 and the analyzer 606 may include an optical polarizer. In some implementations, the polarizer 602 and analyzer 606 may have the same polarization direction. In the example shown in FIG. 6, the polarization directions (D) of the polarizer 602 and the analyzer 606 are both oriented at 45 degrees from the $\vec{x}$-axis on the $\vec{x}$-$\vec{z}$ plane.

In some implementations, the polarizer 602 receives an input photon beam 610 from an optical source (not shown), which emits photons. In some examples, the input photon beam 610 is nonpolarized and may have a first beam divergence angle ($\theta_1$). In some cases, the beam divergence angle can be measured by the angular distribution of the photon beam. In some examples, the beam divergence angle is measured as the half width at half maximum of the photon angular distribution.

In certain implementations, the polarizer 602 may be used to filter photons in the input photon beam 610 which contains photons with undefined and mixed polarizations. For example, the polarizer 602 may allow photons of a specific polarization to pass through and block photons of other polarizations. In some instances, the polarizer 602 may be a linear polarizer. In some examples, the polarizer 602 may be an absorptive polarizer, a beam-splitting polarizer, or other types of optical polarizers.

In certain implementations, the pair of birefringent prisms 604 may include a first birefringent prism 604A and a second birefringent prism 604B. In some instances, the first and second birefringent prisms 604A, 604B may contain optically anisotropic materials having a refractive index that depends on the polarization and incident direction of photons. In some examples, the optically anisotropic materials may have non-cubic crystal structures.

In some implementations, the first and second birefringent prisms 604A and 604B are configured with their optical axes on the Poincare sphere pointing in perpendicular directions relative to the photon beam incident direction ($\vec{y}$). Accordingly, in FIG. 6, the optical axis of the first birefringent prism 604A points in the $+\vec{z}$ direction and that of the second birefringent prism 604B in the $+\vec{x}$ direction. In some implementations, the pair of birefringent prisms 604 may include circular quartz wedges. In some implementations, the first birefringent prism 604A may be configured with its optical axis 616A aligned with the incline direction of the triangular coil 614A and the second birefringent prism 604B may be configured with its optical axis 616B aligned perpendicular to the incline direction of the triangular coil 614B.

In some implementations, the first and second birefringent prisms 604A, 604B are separated by a distance (T) 608 along the incident direction of the input photon beam ($\vec{y}$). In some instances, the first and second birefringent prisms 604A, 604B are configured with inclined sides 614A, 614B facing the incoming photon beam. In some instances, the cross section of each of the first and second birefringent prisms 604A, 604B along the $\vec{y}$-$\vec{z}$ plane is a right triangle with one of the sides parallel to the incident direction of the input photon beam ($\vec{y}$). In some examples, the side that is parallel to the incident direction of the input photon beam has a length (L) 620. In some cases, the first and second birefringent prisms 604A, 604B may be oriented or configured in another manner.

In certain implementations, the analyzer 606 may be used to filter photons in the photon beam exiting the pair of birefringent prisms 604. For example, the analyzer 606 may allow photons of a specific polarization passing through and block photons of other polarizations. In some instances, the analyzer 606 may be a linear polarizer. In some examples, the analyzer 606 may be an absorptive polarizer or a beam-splitting polarizer. In some implementations, the analyzer 606 may contain other types of optical polarizers.

During operation, when the polarized photon beam 610 is received by the first birefringent prisms 604A at its inclined side 614A, photons that have non-zero transverse propagation angles may travel in the first birefringent prisms 604A for a different amount of time than in the second birefringent prisms 604B. Consequently, the photon beam after passing through the pair of birefringent prisms 604 may become non-uniformly polarized.

As shown in FIG. 6, the pair of birefringent prisms 604 and the analyzer 606 can be repeated to increase the level of collimation. For example, the pair of birefringent prisms 604 and the analyzer 606 can be repeated N times, in which N is an integer and N≥2. In some implementations, the inclined angles ($\alpha$) 618A, 618B of the pair of birefringent prisms 604 in the sequential sets may increase as N increases. In some implementations, the greater the inclined angles ($\alpha$) 618A, 618B are, the greater the phase shift to the photon with non-zero transverse propagation angle can be introduced. In this case, the beam divergence angle of the photon beam when exiting the analyzer 606 may be further reduced.

In a general aspect of what is described above, a collimated beam is generated by a collimator system.

In a first example, a neutron beam collimation method includes receiving a neutron beam; polarizing the neutron beam using a polarizer; and obtaining a collimated neutron beam. The neutron beam generated by the neutron source has a first beam divergence and includes a plurality of neutrons. The collimated neutron beam has a second beam divergence. The second beam divergence is less than the first beam divergence. Collimating the neutron beam includes mapping transverse momentum of each respective neutron, of the plurality of neutrons, onto a polarization degree of freedom of the respective neutron by applying a sequence of phase shift gradients to the polarized neutron beam by a gradient system; and, after applying the sequence of phase shift gradients, passing the neutron beam through analyzer.

Implementations of the first example may include one or more of the following features. Polarizing the neutron beam includes passing the neutron beam through a first polarizing spin filter. Passing the neutron beam through the analyzer includes passing the neutron beam through a second polarizing spin filter. Applying the phase shift gradient includes applying a sequence of magnetic field gradients along a perpendicular direction relative to the incoming neutron polarization direction. Applying the sequence of magnetic field gradients includes applying first and second magnetic field gradients at distinct locations along the incident direction of the neutron beam. The first and second magnetic field gradients have opposite orientations. The first and second magnetic field gradients have the same magnitude.

Implementations of the first example may include one or more of the following features. Obtaining the collimated neutron beam includes obtaining a first collimated neutron beam. The sequence of magnetic field gradients includes a first sequence of magnetic field gradients, and the analyzer includes a first analyzer. After obtaining the first collimated neutron beam, a second collimated neutron beam having a third beam divergence can be obtained. The third beam divergence is less than the second beam divergence. Obtaining the second collimated neutron beam further includes applying a second sequence of magnetic field gradients to the first collimated neutron beam; and after applying the second sequence of magnetic field gradients, passing the first collimated neutron beam through a second analyzer. The magnitude of the second sequence of magnetic field gradients are greater than the magnitude of the first sequence of magnetic field gradients.

In a second example, a neutron beam collimation system includes a polarizer, and a collimator subsystem. The polarizer is configured to polarize a neutron beam which has a first beam divergence and includes a plurality of neutrons. The collimator subsystem is configured to obtain a collimated neutron beam with a second beam divergence. The second beam divergence is less than the first beam divergence. The collimator subsystem includes a gradient system and an analyzer. The gradient system is configured to map transverse momentum of each respective neutron, of the plurality of neutrons, onto a polarization degree of freedom of the respective neutron by applying a sequence of phase shift gradients to the polarized neutron beam.

Implementations of the second example may include one or more of the following features. The polarizer includes a first polarizing spin filter and the analyzer includes a second polarizing spin filter. The gradient system includes a sequence of magnetic field gradients along a perpendicular direction relative to the incoming neutron polarization direction. The sequence of magnetic field gradients further includes a first and second magnetic field gradients at distinct locations along the incident direction of the neutron beam. The first and second magnetic field gradients are configured in opposite orientations. The first and second magnetic field gradients are configured with the same magnitude.

Implementations of the second example may include one or more of the following features. The collimated neutron beam further includes a first collimated neutron beam; the sequence of magnetic field gradients includes a first sequence of magnetic field gradients; and the analyzer includes a first analyzer. The neutron beam collimation system further includes a second sequence of magnetic field gradients, and a second analyzer. The second sequence of magnetic field gradients and the second analyzer are configured to collimate the first collimated beam and obtain a second collimated beam which has a third beam divergence. The third beam divergence is less than the second beam divergence. The magnitude of the magnetic field gradients of the second sequence of magnetic field gradients are greater than the magnitude of the magnetic field gradients of the first sequence of magnetic field gradients.

Implementations of the second example may include one or more of the following features. The gradient system includes a pair of triangular coils. The pair of triangular coils includes first and second triangular coils at distinct locations along the incident direction of the neutron beam. The first and second triangular coils are configured to generate magnetic fields having opposite orientations in the first and second triangular coils. The magnetic fields in the first and second triangular coils have the same magnitude.

Implementations of the second example may include one or more of the following features. The collimated neutron beam includes a first collimated neutron beam; the pair of triangular coils includes a first pair of triangular coils; and the analyzer includes a first analyzer. The neutron beam collimation system further includes a second pair of triangular coils; and a second analyzer. The second pair of triangular coils and the second analyzer are configured to collimate the first collimated beam and obtain a second collimated beam with a third beam divergence. The third beam divergence is less than the second beam divergence. The magnitude of the magnetic fields in the second pair of triangular coils are greater than the magnitude of the magnetic field in the first pair of triangular coils. The inclined angle of the second pair of triangular coils are greater than the inclined angle of the first pair of triangular coils.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of examples have been described. Nevertheless, it will be understood that various modifications can be made. Accordingly, other examples are within the scope of the following claims.

The invention claimed is:

1. A neutron beam collimation method comprising:
   receiving a neutron beam having a first beam divergence and comprising a plurality of neutrons;
   polarizing the neutron beam using a polarizer, wherein the polarizer produces a polarized neutron beam; and
   obtaining a collimated neutron beam from the polarized neutron beam, the collimated neutron beam having a second beam divergence that is less than the first beam divergence, wherein obtaining the collimated neutron beam comprises:
      mapping transverse momentum of each respective neutron, of the plurality of neutrons, onto a polarization degree of freedom of the respective neutron by applying a sequence of phase shift gradients to the polarized neutron beam using a gradient system; and
      after mapping the transverse momentum, passing the polarized neutron beam through an analyzer.

2. The method of claim 1, wherein polarizing the neutron beam comprises passing the neutron beam through a first polarizing spin filter.

3. The method of claim 2, wherein passing the polarized neutron beam through the analyzer comprises passing the polarized neutron beam through a second polarizing spin filter.

4. The method of claim 1, wherein the polarizer defines a polarization direction, applying the sequence of phase shift gradients comprises applying a sequence of magnetic field gradients, and each of the magnetic field gradients has a gradient orientation that is perpendicular to the polarization direction.

5. The method of claim 4, wherein applying the sequence of magnetic field gradients comprises applying first and second magnetic field gradients at distinct locations along a propagation direction of the neutron beam, and the first and second magnetic field gradients have opposite gradient orientations.

6. The method of claim 5, wherein the first and second magnetic field gradients have the same gradient magnitude.

7. The method of claim 4, wherein obtaining the collimated neutron beam comprises obtaining a first collimated neutron beam, the sequence of magnetic field gradients comprises a first sequence of magnetic field gradients, the analyzer comprises a first analyzer, and the method further comprises:
   obtaining a second collimated neutron beam from the first collimated neutron beam, the second collimated neutron beam having a third beam divergence that is less than the second beam divergence, wherein obtaining the second collimated neutron beam comprises:
      applying a second sequence of magnetic field gradients to the first collimated neutron beam; and
      after applying the second sequence of magnetic field gradients, passing the first collimated neutron beam through a second analyzer.

8. The method of claim 7, wherein the first sequence of magnetic field gradients each has a first gradient magnitude, and the second sequence of magnetic field gradients each has a second gradient magnitude that is greater than the first gradient magnitude.

9. The method of claim 1, wherein applying the sequence of phase shift gradients comprises applying a pair of magnetic fields by operation of a pair of triangular coils.

10. The method of claim 9, wherein the pair of triangular coils comprises first and second triangular coils, applying the pair of magnetic fields comprises applying first and second magnetic fields at distinct locations along a propagation direction of the neutron beam, and the first and second magnetic fields generated by the respective first and second triangular coils have opposite orientations.

11. The method of claim 9, wherein obtaining the collimated neutron beam comprises obtaining a first collimated neutron beam, the pair of magnetic fields comprises a first pair of magnetic fields generated by a first pair of triangular coils, the analyzer comprises a first analyzer, and the method further comprises:
   obtaining a second collimated neutron beam from the first collimated neutron beam, the second collimated neutron beam having a third beam divergence that is less than the second beam divergence, wherein obtaining the second collimated neutron beam comprises:
      applying a second pair of magnetic fields by operation of a second pair of triangular coils to the first collimated neutron beam; and
      after applying the second pair of magnetic fields, passing the first collimated neutron beam through a second analyzer.

12. The method of claim 11, wherein the first pair of magnetic fields each has a first field strength, and the second pair of magnetic fields each has a second field strength that is greater than the first field strength.

13. The method of claim 11, wherein the first pair of triangular coils each has a first incline angle, and the second pair of triangular coils each has a second incline angle that is greater than the first incline angle.

14. A neutron beam collimation system comprising:
   a polarizer configured to polarize a neutron beam, the neutron beam having a first beam divergence and comprising a plurality of neutrons; and
   a collimator subsystem configured to receive a polarized neutron beam from the polarizer and produce a collimated neutron beam having a second beam divergence that is less than the first beam divergence, the collimator subsystem comprising a gradient system and an analyzer, the gradient system configured to map transverse momentum of each respective neutron, of the plurality of neutrons, onto a polarization degree of freedom of the respective neutron by applying a sequence of phase shift gradients to the polarized neutron beam.

15. The system of claim 14, wherein the polarizer comprises a first polarizing spin filter.

16. The system of claim 15, wherein the analyzer comprises a second polarizing spin filter.

17. The system of claim 14, wherein the polarizer defines a polarization direction, the gradient system comprises a sequence of magnetic field gradients, and each of the magnetic field gradients has a gradient orientation that is perpendicular to the polarization direction.

18. The system of claim 17, wherein the sequence of magnetic field gradients comprises first and second magnetic field gradients at distinct locations along a propagation direction of the neutron beam, and the first and second magnetic field gradients have opposite gradient orientations.

19. The system of claim 18, wherein the first and second magnetic field gradients have the same gradient magnitude.

20. The system of claim 17, wherein the collimated neutron beam comprises a first collimated neutron beam, the sequence of magnetic field gradients comprises a first sequence of magnetic field gradients, the analyzer comprises a first analyzer, and the collimator subsystem further comprises a second sequence of magnetic field gradients and a second analyzer.

21. The system of claim 20, wherein the first sequence of magnetic field gradients each has a first gradient magnitude, and the second sequence of magnetic field gradients each has a second gradient magnitude that is greater than the first gradient magnitude.

22. The system of claim 14, wherein the gradient system comprises a pair of triangular coils.

23. The system of claim 22, wherein the pair of triangular coils comprises first and second triangular coils at distinct locations along a propagation direction of the neutron beam, and the first and second triangular coils are configured to generate magnetic fields having opposite field orientations.

24. The system of claim 23, wherein the magnetic fields generated by the first and second triangular coils have the same field strength.

25. The system of claim 22, wherein the collimated neutron beam comprises a first collimated neutron beam, the pair of triangular coils comprises a first pair of triangular coils, the analyzer comprises a first analyzer, and the collimator subsystem further comprises a second pair of triangular coils and a second analyzer.

26. The system of claim 25, wherein the first pair of triangular coils is configured to generate magnetic fields having a first field strength, and the second pair of triangular coils is configured to generate magnetic fields having a second field strength that is greater than the first field strength.

27. The system of claim 25, wherein the first pair of triangular coils each has a first incline angle, and the second pair of triangular coils each has a second incline angle that is greater than the first incline angle.

* * * * *